(12) United States Patent
Wiggers et al.

(10) Patent No.: US 9,021,449 B2
(45) Date of Patent: *Apr. 28, 2015

(54) SOFTWARE REGRESSION TESTING USING SYMBOLIC EXECUTION

(75) Inventors: Maarten H. Wiggers, San Jose, CA (US); Mukul R. Prasad, San Jose, CA (US); Indradeep Ghosh, Cupertino, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/587,430

(22) Filed: Aug. 16, 2012

(65) Prior Publication Data

US 2014/0053134 A1 Feb. 20, 2014

(51) Int. Cl.
*G06F 9/44* (2006.01)
*G06F 11/36* (2006.01)

(52) U.S. Cl.
CPC .......... *G06F 11/3608* (2013.01); *G06F 11/368* (2013.01)

(58) Field of Classification Search
CPC .............. G06F 7/78; G06F 8/00–8/78; G06F 9/44–9/455; G06F 11/36
USPC .................................. 717/100–178
See application file for complete search history.

(56) References Cited

U.S. PATENT DOCUMENTS

| | | | |
|---|---|---|---|
| 2009/0089759 A1 | 4/2009 | Rajan et al. | |
| 2010/0125832 A1 | 5/2010 | Prasad et al. | |
| 2010/0223599 A1 | 9/2010 | Ghosh et al. | |
| 2010/0242029 A1 | 9/2010 | Tkachuk et al. | |
| 2011/0072417 A1* | 3/2011 | Dhurjati et al. | 717/124 |
| 2011/0173591 A1* | 7/2011 | Prasad | 717/126 |
| 2011/0314454 A1* | 12/2011 | Godefroid et al. | 717/131 |
| 2012/0192150 A1 | 7/2012 | Li et al. | |
| 2012/0192162 A1 | 7/2012 | Li et al. | |
| 2012/0192169 A1 | 7/2012 | Li et al. | |
| 2012/0204154 A1 | 8/2012 | Li et al. | |
| 2013/0159963 A1* | 6/2013 | Dhalait | 717/104 |

OTHER PUBLICATIONS

Pasareanu et al., Combining Unit-level Symbolic Execution and System-level Concrete Execution for Testing NASA Software, 2008.*
Kim et al., SCORE:A Scalable Concolic Testing Tool for Reliable Embedded Software, 2011.*
Sen, Concolic Testing, 2007.*
Yang et al., "Memoized Symbolic Execution", ISSTA 2012, Proceedings of the 2012 International Symposium on Software Testing and Analysis, pp. 144-154.
Godefroid et al., "DART: Directed Automated Random Testing", Proceedings of the 2005 ACM SIGPLAN conference on Programming language design and implementation, pp. 213-223.

(Continued)

*Primary Examiner* — Wei Zhen
*Assistant Examiner* — Zhan Chen
(74) *Attorney, Agent, or Firm* — Maschoff Brennan

(57) ABSTRACT

A method of testing software may include accessing first software that includes multiple execution paths and concretely executing the first software using a test case associated with second software to traverse at least a first execution path of the execution paths. The method may also include capturing concrete execution results produced from concretely executing the first software to record the first execution path and symbolically executing the first software using a symbolic input based on the recorded first execution path.

22 Claims, 6 Drawing Sheets

(56) References Cited

OTHER PUBLICATIONS

Cadar et al., "KLEE: Unassisted and Automatic Generation of High-Coverage Tests for Complex Systems Programs", OSDI 2008, Proceedings of the 8th USENIX conference on Operating systems design and implementation pp. 209-224.

Godefroid, "Automated Whitebox Fuzz Testing", Proceedings of NDSS, 2008, pp. 1-16.

Sen et al. "CUTE: A Concolic Unit Testing Engine for C", ESEC/FSE-13 2005, Proceedings of the 10th European software engineering conference held jointly with 13th ACM SIGSOFT international symposium on Foundations of software engineering, pp. 263-272.

Majumdar et al., "Hybrid Concolic Testing", ICSE 2007 Proceedings of the 29th international conference on Software Engineering, pp. 416-426.

Pasareanu et al., "Symbolic Execution with Mixed Concrete—Symbolic Solving", ISSTA 2011, pp. 34-44.

* cited by examiner

SOFTWARE REGRESSION TESTING USING SYMBOLIC EXECUTION

FIELD

The embodiments discussed herein are related to testing software.

BACKGROUND

Testing software, such as validating or verifying software, is a common activity among information technology (IT) organizations. For example, whether the software is a desktop application for execution at one or more client computer systems or a web application for execution at one or more server computer systems, it is often important to verify the quality of the software. While some types of errors in software, cause only annoyance or inconvenience to users, other types of errors have the potential to cause other problems, such as data and financial loss.

Software testing may be performed after a software update is performed. For example, software may be updated to fix a problem, provide additional operations or enhancements, or for some other reason. This type of software testing is commonly referred to as regression testing of the software. In general, regression testing may be performed to uncover new software errors in software after changes to the software have been performed.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of testing software may include accessing first software that includes multiple execution paths and concretely executing the first software using a test case associated with second software to traverse at least a first execution path of the execution paths. The method may also include capturing concrete execution results produced from concretely executing the first software to record the first execution path and symbolically executing the first software using a symbolic input based on the recorded first execution path.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
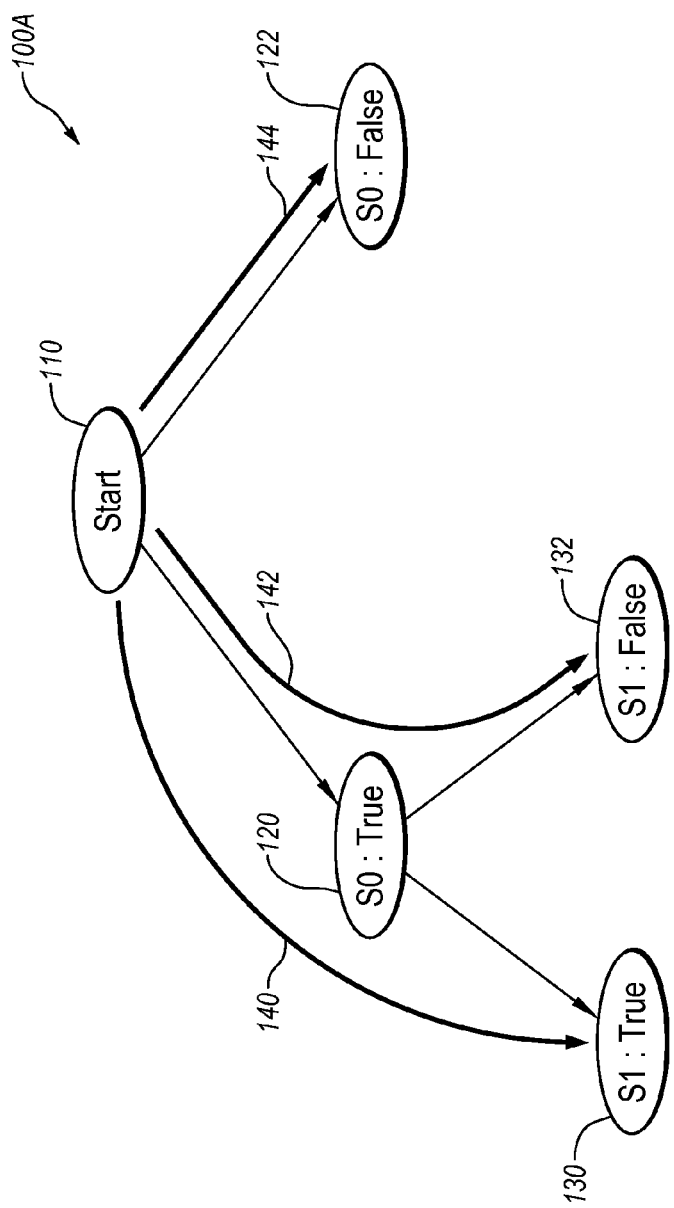
FIG. 1A is a diagram representing an example execution of example software using example test cases.

Some embodiments described herein relate to methods and systems of testing software. The software to be tested may include multiple execution paths formed from one or more software statements, such as conditional statements, assignment statements, equations, other lines of code of the software, block(s) of lines of code of the software, and/or multiple statements within the software.

In some embodiments, to test the software, the software may be concretely executed using a test case associated with other software to traverse at least one execution path of the multiple execution paths. Concrete execution results produced from concretely executing the software may be captured to record the execution path. For example, in some embodiments, the execution path traversed during the concrete execution may be recorded to form a partial symbolic execution tree.

After concretely executing the software, the software may be symbolically executed, using one or more symbolic inputs, based on the concrete execution results. During the symbolic execution, one or more portions of one or more of the multiple execution paths may be symbolically executed. Symbolically executing the software may provide greater testing coverage of the software than concretely executing the test case.

In some embodiments, the other software with which the test case is associated may be a previous version of the software. In these and other embodiments, the test case may be a test case configured for the previous version of the software. As such, changes in the software from the previous version may not be covered by the test case. To provide better testing coverage of the software, the software may be concretely executed using the test case and then symbolically executed based on the concrete execution results.

In some circumstances, extracting and solving a path condition formula for one or more portions of one or more of the multiple execution paths during symbolic execution of software may be time consuming and/or resource intensive. In some circumstances, developing test cases for testing software may be time consuming and/or resource intensive. By reusing a test case from a previous version of the software to test the software, the time and/or the resources to develop the test case may be reduced. To provide better testing coverage of the software, the software may also be symbolically executed. By symbolically executing the software based on the concrete execution results, a number of path condition formulas extracted and solved during symbolic execution of the software may be reduced as compared to solving path condition formulas for all of or a majority of the portions of the multiple execution paths of the software. Thus, in some embodiments, the methods and systems described herein may reduce the time and resources involved in testing software while maintaining adequate testing coverage of the software.

Concrete execution is the execution of a software program using concrete values for various inputs of the software program such as integers, real numbers, strings, characters, true/false, and other arbitrary real values. The concrete execution of software with a single set of concrete inputs may follow a single execution path through the software. The concrete execution and the resulting output, may be examined to determine if and/or when errors may occur within the software or to perform other analyses of the software.

Symbolic execution is a formal software verification technique that is derived from symbolic computation, which uses machines, such as computers, to manipulate mathematical equations and expressions in symbolic form. As applied to software testing, symbolic execution may also be used to analyze if and/or when errors in source code of the software may occur, to predict how code statements affect specified inputs and outputs, and to consider path traversal within the software.

To test software using symbolic execution, symbols representing sets of values replace individual concrete input values, such as numbers, strings, true/false, etc., for the software. The operations used to manipulate such variables are replaced with symbolic versions of the operations so that they may manipulate symbolic formulas and symbols instead of concrete values. The software is then executed as in a normal execution. Systematic analysis may then be performed on the generated symbolic formulas to test the software.

Embodiments of the present invention will be explained with reference to the accompanying drawings.

FIG. 1A is a diagram representing an example execution 100A of example software using example test cases, arranged in accordance with at least some embodiments described herein. Table 1 includes code corresponding to the example software, function example1, used in the example execution 100A.

TABLE 1

| Function Example1 | Test1 | Test2 | Test3 |
|---|---|---|---|
| int func (int a, int b)<br>{<br>S0: if (a > 10) {<br>S1: if (b < 5)<br>return 3;<br>else<br>return 2;<br>}<br>else<br>return 1;<br>} | void test1( ){<br>int r =<br>func(11, 4)<br>equal (r, 3);<br>} | void test2( ){<br>int r = func(11, 5)<br>equal (r, 2);<br>} | void test3( ){<br>int r =<br>func(10, 0)<br>equal (r, 1);<br>} |

In Table 1, the function example1 has two input variables, "a" and "b." With concrete execution of the function example1, the variables "a" and "b" may each have any integer value, such as . . . −2, −1, 0, 1, 2 . . . . Table 1 also includes the functions test1, test2, and test3 that are test cases for the function example1. In some embodiments, a compilation of more than one test case may be referred to as a test suite. The test suite of the test cases test1, test2, and test3 may be configured to provide concrete inputs to the function example1 so as to provide coverage of execution paths of the function example1 as illustrated in FIG. 1A. By providing coverage of the execution paths, the test suite may be configured to determine an error in the function example1, such as an infinite loop or some other type of execution path error.

In addition to providing coverage of the execution paths, the test suite may be configured to verify the correctness of the function example1. Verifying the correctness of the function example1 may include determining that the function example1 provides correct output for a set of known concrete inputs. To verify the correctness of the function example1, each of the test cases test1, test2, and test3 may include an "equal" function call that may compare a result "r" of the function example1 based on two concrete input variables with a correct output of the function example1. For example, the test case test1 may provide concrete inputs of 11 and 4 and compare the output of the function example1 to the expected output 3 of the function example1.

FIG. 1A illustrates various nodes 110, 120, 122, 130, 132 of the function example1. The nodes 110, 120, 122, 130, 132 may represent branching points within the function example1. The nodes 110, 120, 122, 130, 132 may be coupled by arcs. In some embodiments, the arcs may represent the transition between the nodes 110, 120, 122, 130, 132 and thus transitions between the branching points in the function example1, by executing software statements that separate the branching points. In some embodiments, the branching points may be conditional statements, or other branching statements. In these and other embodiments, the software statements may be assignments, or other operations performed by software. FIG. 1A further illustrates first, second, and third execution paths 140, 142, 144 that may be traversed by the function example1 when the function example1 concretely executes the test cases test1, test2, and test3, respectively.

Execution of the function example1 may begin at node 110. Node 110 may be followed by either node 120 or node 122 depending on the variable "a" because the line S0 includes a conditional if statement. When variable "a" is less than or equal to 10, the line S0 evaluates to false; the function example1 proceeds to node 122 and returns 1 and the function example1 ends. When variable "a" is greater than 10, the line S0 evaluates as true; and the function example1 proceeds to node 120. Node 120 may be followed by node 130 or node 132 depending on the variable "b" because the line S1 includes a conditional if statement. When variable "b" is less than or equal to 5, the line S1 evaluates to true; the function example1 proceeds to node 130 and returns 3 and the function example1 ends. When variable "b" is greater than or equal to 5, the line S1 evaluates as false; the function example1 proceeds to node 132 and returns 2 and the function example1 ends.

Note that the evaluation of the line S1 depends on the previous evaluation of line S0. In some embodiments, the evaluation of software statements within software may depend on software statements that have been previously evaluated. The evaluation of a software statement that depends on previously evaluated software statements may be referred to herein as evaluating a portion of an execution path of the software. In these and other embodiments, to evaluate a portion of an execution path may involve the evaluation of multiple software statements that depend on each other. In some embodiments, the evaluation of a software statement that does not depend on previously evaluated software statements may be referred to herein as evaluating a portion of an execution path of the software. In some embodiments, a portion of an execution path that is evaluated may be a whole portion of the execution path or only a part thereof.

When the function example1 is executed using the test case test1, the function example1 may traverse the execution path 140 that includes nodes 110, 120, 130 and may return 3. The function example1 returning 3 may allow the test case test1 to verify a correctness of the function example1 for the execution path 140. When the function example1 is executed using the test case test2, the function example1 may traverse the execution path 142 that includes nodes 110, 120, 132 and may return 2. The function example1 returning 2 may allow the test case test2 to verify a correctness of the function example1 for the execution path 142. When the function example1 is executed using the test case test3, the function example1 may traverse the execution path 144 that includes nodes 110, 122 and may return 1. The function example1 returning 1 may allow the test case test3 to verify a correctness of the function example1 for the execution path 144.

Figure 1B:
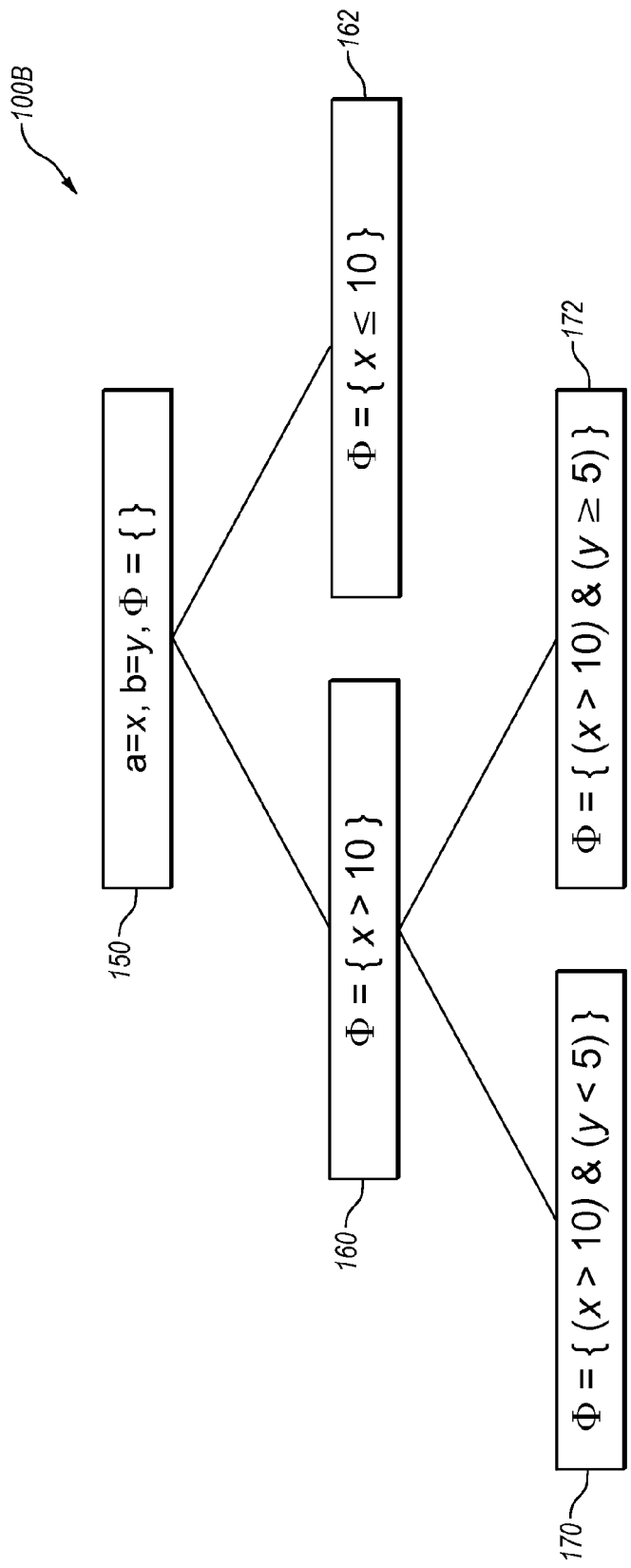
FIG. 1B is a diagram representing an example symbolic execution of the software of FIG. 1A.

FIG. 1B is a diagram representing an example symbolic execution 100B of the software of FIG. 1A, arranged in accordance with at least some embodiments described herein. The boxes 150, 160, 162, 170, 172 may each represent the symbolic execution of a portion of an execution path within the function example1 and may generally correspond to nodes 110, 120, 122, 130, and 132 of FIG. 1A, respectively. With symbolic execution, the variables "a" and "b" are each assigned a symbolic value that may represent any arbitrary integer value.

FIG. 1B illustrates an example where variable "a" is assigned symbolic value "x" and variable "b" is assigned symbolic value "y," where the symbolic values "x" and "y" each represent an arbitrary integer value. The code statement "a>10" at line S0 symbolically computes as "x>10." The code statement "b<5" at line S1 symbolically computes as "y<5."

The symbol "Φ" denotes path condition formulas to be analyzed at each step. A path condition formula may be an expression characterizing an execution path traversed by the symbolic execution of a function at any given point during symbolic execution of the function. In box 150, the two variables of function example1, "a" and "b" are assigned symbolic values "x" and "y," respectively. Since this is the beginning of the symbolic execution and no symbolic computation has been performed so far, the path condition formula "Φ" is empty.

Box 150 may be followed by box 160 or 162 because the line S0, of the function example1 is a conditional "if" statement. Depending on whether the condition, e.g., "a>10" or, in symbolic form, "x>10," is met, box 150 may be followed by box 160 or box 162. When the condition "x>10" is met, at box 160 the path condition formula Φ updates to "Φ {x>10}." When the condition "x>10" is not met, at box 162 the path condition formula Φ updates to "Φ={x≤10}." Box 160 may be followed by box 170 or 122 because the line S1, of the function example1 is a conditional "if" statement. When the condition "y<5" is met, at box 170 the path condition formula Φ updates to "Φ={"x>10" & "y<5"}." When the condition "y<5" is not met, at box 172 the path condition formula Φ updates to "Φ={"x>10" & "y≥5"}." Note that similar to FIG. 1A, where the evaluation of the line S1 includes the evaluation of previous lines of the function example1, in symbolic evaluation, the path condition formula for each box changes to represent the software statements that are evaluated to reach the box. In some embodiments, each time there is an update to the path condition formula, the resulting path condition formula may be checked for satisfiability. Such updates may occur at every branch point in software, for example the "if" statement of line S1, or at other points in the software. When the path condition formula is found to be unsatisfiable, symbolic execution is not continued down that execution path.

One way to test the function example1 may be to generate a test case for each execution path covered by the symbolic execution. The symbolic execution of the function example1 in FIG. 1B has three execution paths represented by the boxes 162, 170, and 172. To generate a test-case, the path condition formula at boxes 162, 170, and 172 may be checked for satisfiability to generate concrete values for the symbolic variables x and y corresponding respectively to values for the input variables a and b of the function example1. Each set of concrete input values generated for the variables a and b in this manner may constitute a test case for the function example1. The function example1 may be concretely executed with these values and the execution monitored to reveal potential errors in the function example1.

The function example1 has only a few lines of code, mainly for illustrative purposes. However, in other situations, the software under analysis may have many variables and many lines of code. The complexity of the analysis when generating and solving path condition formulas for portions of execution paths may increase rapidly as the number of variables increases. The demand on resources in terms of processing power, memory, time, etc. may be large for path condition formula generating and solving.

Figure 2:
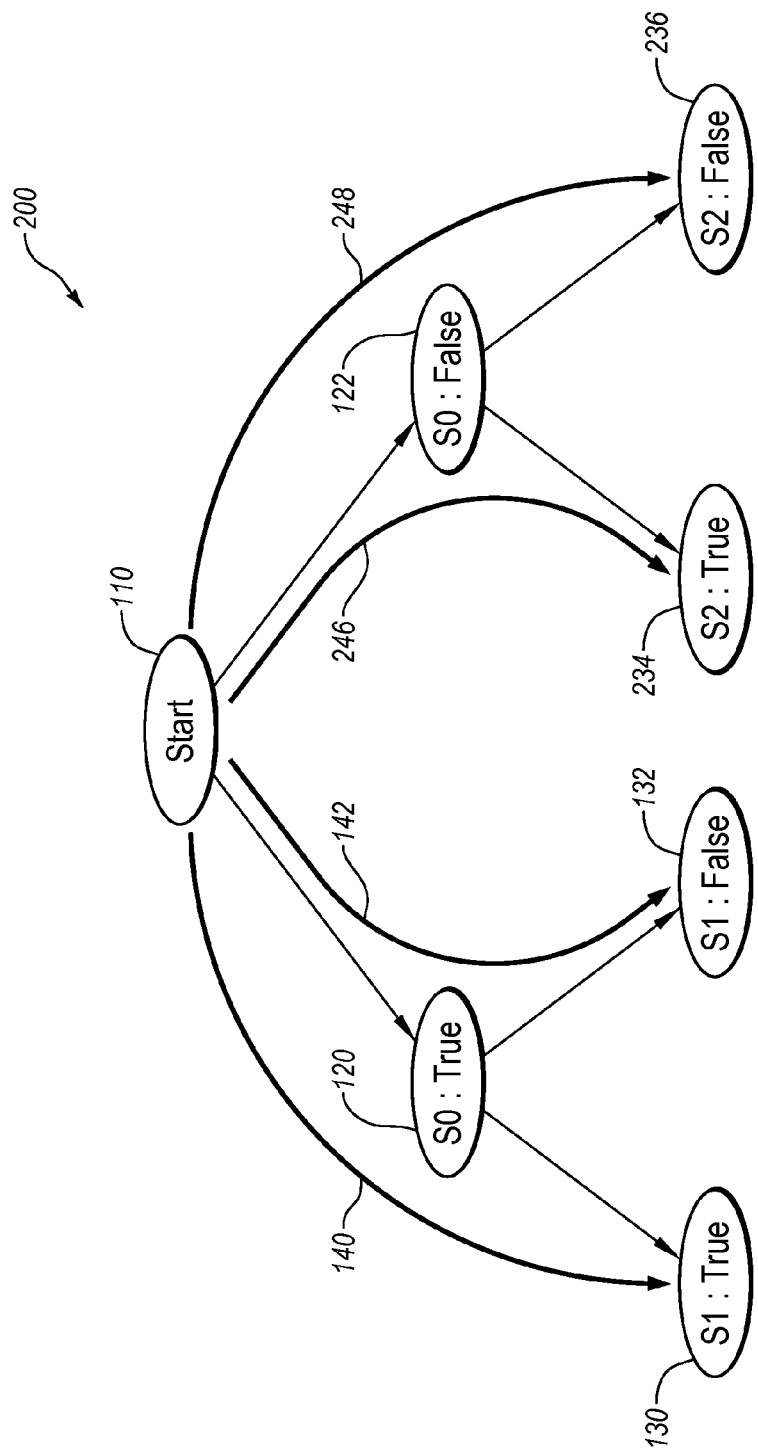
FIG. 2 is a diagram representing an example execution of example software using the test cases from FIG. 1A and symbolic execution.

FIG. 2 is a diagram representing an example execution 200 of example software using the test cases from FIG. 1A and symbolic execution, arranged in accordance with at least some embodiments described herein. Table 2 includes code corresponding to the example software, function example2, used in the example execution 200. Table 2 also includes the functions test1, test2, and test3 that are associated with the function example1 from FIGS. 1A and 1B, but used as test cases for the function example2.

TABLE 2

| Function Example 2 | Test1 | Test2 | Test3 |
|---|---|---|---|
| int func (int a, int b)<br>{<br>S0:  if (a > 10) {<br>S1:    if (b < 5)<br>         return 3;<br>       else<br>         return 2;<br>    }<br>    else {<br>S2:    if ( b < 5)<br>         return 1;<br>       else<br>         return 0;<br>    }<br>}} | void test1( ){<br>int r =<br>func(11, 4)<br>equal (r, 3);<br>} | void test2( ){<br>int r = func(11, 5)<br>equal (r, 2);<br>} | void test3( ){<br>int r =<br>func(10, 0)<br>equal (r, 1);<br>} |

In Table 2, the function example2 has two input variables, "a" and "b." With concrete execution of the function example2, the variables "a" and "b" may each have any integer value, such as . . . −2, −1, 0, 1, 2 . . . . The function example2 is similar to the function example1 in that the lines of code S0 and S1 of the function example1 and the function example2 are the same. The function example2 includes an additional fragment of code implemented by the if-then-else block at S2. In some embodiments, the function example1 may be considered a previous version of the function example2.

To test the function example2, the function example2 may be executed using the test cases test1, test2, and test3. Note that the test cases test1, test2, and test3 are for and associated with the function example1. Thus, the test cases test1, test2, and test3 may not provide adequate testing coverage of the function example2, but may provide some testing coverage of the function example2. In general, in some embodiments, test cases associated with other software may provide adequate testing coverage of software.

FIG. 2 illustrates various nodes 110, 120, 122, 130, 132, 234, 236. The nodes 110, 120, 122, 130, 132 may correspond to and/or be similar to the nodes 110, 120, 122, 130, 132 of FIG. 1A. The nodes 110, 120, 122, 130, 132, 234, 236 may represent branching points within the function example2. The nodes 110, 120, 122, 130, 132, 234, 236 may be coupled by arcs. The arcs may represent the transition between the nodes 110, 120, 122, 130, 132, 234, 236 and thus transitions between the branching points in the function example2 through symbolic and/or concrete execution of intervening software statements in the function example2.

FIG. 2 further illustrates first, second, third, and fourth execution paths 140, 142, 246, 248 that provide complete testing coverage of the function example2 because the execution paths 140, 142, 246, 248 traverse the executions paths of the function example2. The first execution path 140 may traverse the nodes 110, 120, and 130 and may correspond to the first execution path 140 of FIG. 1A. The first execution path 140 may be traversed when the function example2 is concretely executed using the test case test1.

The second execution path 142 may traverse the nodes 110, 120, and 132 and may correspond to the second execution path 142 of FIG. 1A. The second execution path 142 may be traversed when the function example2 is concretely executed using the test case test2.

The third execution path 246 may traverse the nodes 110, 122, and 234. The third execution path 246 may be traversed when the function example2 is concretely executed using the test case test3. Note that the third execution path 246, traversed when concretely executing the function example2 using the test case test3, varies from the third execution path 144 of FIG. 1A that is traversed when concretely executing the function example1 using the test case test3. The third execution path 246 traverses the node 122 like the third execution path 144 of FIG. 1A but also traverses the node 234 unlike the third execution path 144 of FIG. 1A.

As illustrated in FIG. 2, the test cases test1, test2, and test3 when executed by the function example2 do not provide complete testing coverage of the function example2 as the test cases test1, test2, and test3 do not traverse the fourth execution path 248. To have the fourth execution path 248 traversed, the function example2 may be symbolically executed. In some embodiments, the function example2 may be symbolically executed based on the previous concrete executions. By symbolically executing the function example2 based on the previous concrete executions, the execution paths or portion of execution paths that were not traversed during the concrete execution of the function example2 may be traversed by the symbolic execution of the function example2. Symbolic execution of the function example1 may provide better testing coverage of the function example2.

The function example2 has only a few lines of code and varies only slightly from the function example1, mainly for illustrative purposes. However, in other situations, the software under analysis may have many variables and many lines of code and may be different in varying degrees from previous software for which test cases used while executing the software may have been constructed and associated. The function example2, the execution 200 of the function example2, the relationship between the function example1 and the function example2, and the test cases test1, test2, and test3 are for explanatory purposes and should not limit the scope of the disclosure.

Figure 3:
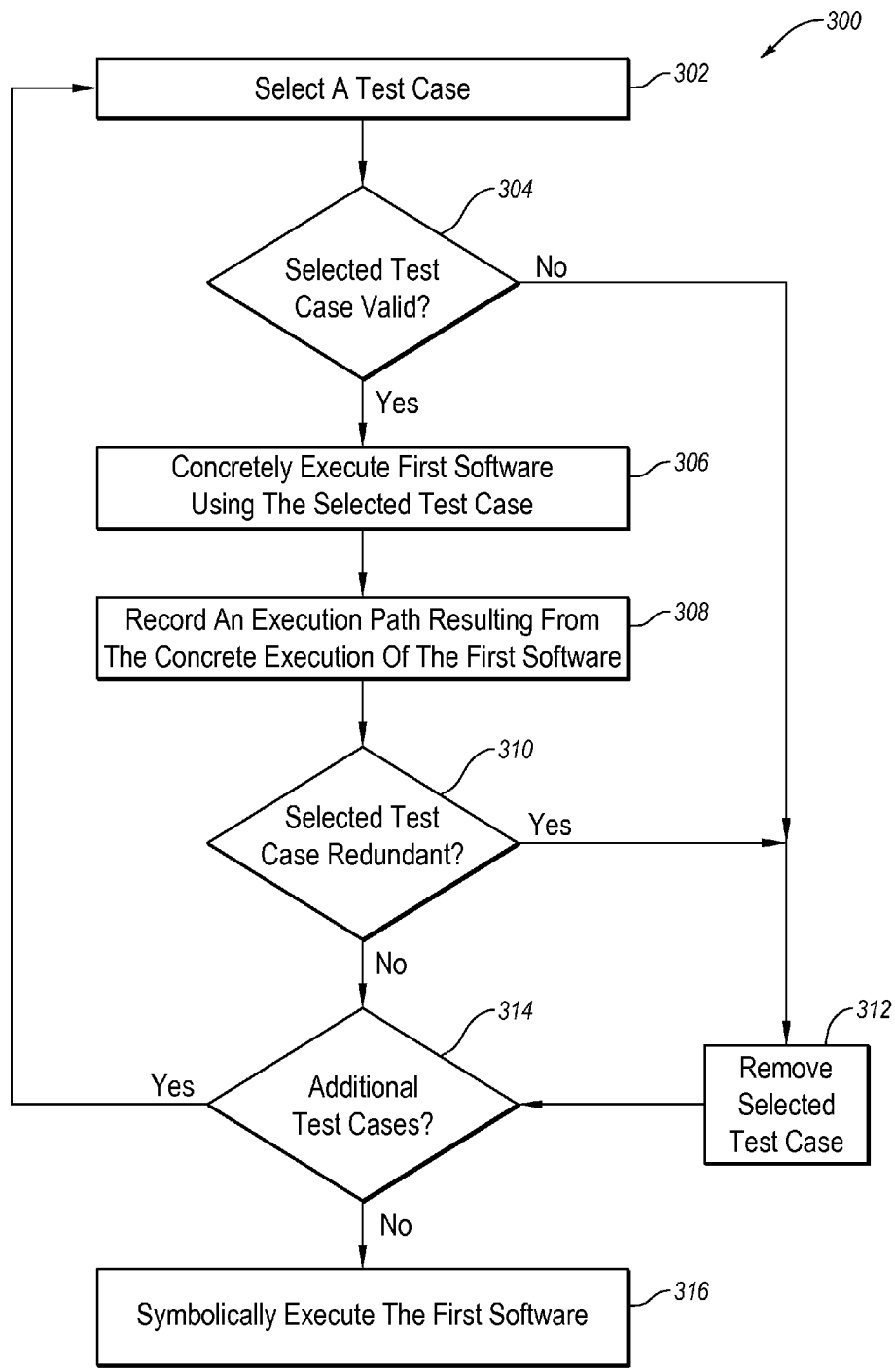
FIG. 3 is a flow chart of an example method of testing software.

FIG. 3 is a flow chart of an example method 300 of testing software, arranged in accordance with at least some embodiments described herein. The method 300 may be implemented, in some embodiments, by a testing system, such as a testing system 400 of FIG. 4. For instance, a processor 440 of the testing system 400 of FIG. 4 may be configured to execute computer instructions to perform operations for testing software as represented by one or more of blocks 302, 304, 306, 308, 310, 312, 314, and/or 316 of the method 300. Although illustrated as discrete blocks, various blocks may be divided into additional blocks, combined into fewer blocks, or eliminated, depending on the desired implementation.

The method 300 may begin at block 302, where a test case may be selected. The test case may be selected for testing first software. The test case may not be constructed for testing the first software. Rather, the test case may be constructed for testing second software and thus associated with the second software. In some embodiments, the first and second software may be related. In some embodiments, the second software may be a previous version of the first software. In these and other embodiments, the second software may be an immediate previous version of the first software or some other previous version of the first software. For example, the second software may be version 1, 2, or 3 and the first software may be version 4. In these and other embodiments, the first software may differ from the second software. The first software may differ from the second software by including less or more lines of code, less or more program statements, less or more function statements, and/or different execution paths, among other ways.

In some embodiments, the selected test case may be selected from multiple test cases that are associated with the second software. The multiple test cases associated with the second software may form a test suite. In some embodiments, the selected test case may be the only test case associated with the second software. In some embodiments, the multiple test cases may be selected from test cases associated with multiple software instances that include the second software and that are associated with the first software. In these and other embodiments, the multiple software instances may be previous versions of the first software. For example, test cases from a third, a fourth, and the second software may form a test suite from which the selected test case is selected.

In block 304, it may be determined whether the selected test case is valid for the first software. The selected test case may be valid for the first software when the first software may be executed using the selected test case. In some embodiments, the selected test case may be determined to be valid by compiling the selected test case before concrete execution of the first software using the selected test case. When the selected test case compiles, the selected test case may be valid. In some embodiments, other methods may be used to determine if the selected test case is valid. The selected test case may be invalid for various reasons, such as not having enough variables for inputs of the first software, not properly calling the software, among other reasons.

When the selected test case is valid, the method 300 may proceed to block 306. When the selected test case is not valid, the method 300 may proceed to block 312.

In block 306, the first software may be concretely executed using the selected test case. Concretely executing the first software using the selected test case may traverse one or more execution paths of the first software. An execution path of the first software may be formed from one or more software statements. As discussed previously, a software statement may include conditional statements, algorithms, comparisons, function calls, lines of code of the software, block(s) of lines of code of the software, and/or multiple statements within the software. Thus the execution path may include any path through the aforementioned statements. For example, in some embodiments, the execution path may include a path through lines of code of the first software. Alternately or additionally, the execution path may include a path through conditional statements, function calls, or other execution paths.

Different execution paths taken through the first software may provide for different degrees of testing coverage of the first software. For example, some execution paths may provide for functional coverage of the first software. Alternately or additionally, other execution paths may provide for statement coverage, decision coverage, conditional coverage, parameter value coverage, and/or some combination of the above. All different types of coverage as provided by different execution paths are considered herein.

In block 308, the execution path resulting from concretely executing the first software using the selected test case may be recorded. In some embodiments, the execution path may be recorded using one or more data strings. The data strings may be stored in a data-structure, such as a trie, hash, binary tree data-structure, among other data-structures. For example, in some embodiments, each software statement traversed by the execution path may be recorded using a data string. In some embodiments, each software statement including a branching point may be recorded in a data string. The data string may be stored in a trie data-structure. In some embodiments, recording the execution path may result in forming a partial execution tree. An execution tree may include a data structure that includes information about execution paths or portions of execution paths of software that provide coverage of the software. A partial execution tree may include information about execution paths or portions of execution paths of software that provide partial coverage of the software.

In block 310, it may be determined if the selected test case is redundant. The selected test case may be redundant when the execution path traversed by the first software when concretely executing the selected test case is also traversed by the first software when concretely executing another test case. An execution path may be determined to be the same as another execution path if the execution paths follow the same sequence of program statements, follow the same sequence of byte-code and/or assembly instructions, follow the same sequence of function calls, and/or follow the same branches that evaluate to the same values, among other criteria.

When the selected test case is not redundant, the method 300 may proceed to block 314. When the selected test case is redundant, the method 300 may proceed to block 312.

In block 312, the selected test case may be removed from a test suite being used to test the first software. In some embodiments, the removed test case may be brought back into the test suite when the test suite is used to test third software, such as a future version of the first software.

In block 314, it is determined whether there are additional test cases that may be used to test the first software. For example, the selected test case may be part of a test suite associated with the second software and additional test cases within the test suite may be used to test the first software.

When there are no additional test cases, the method 300 may proceed to block 316. In some embodiments, the method 300 may proceed to block 316 when there are additional test cases if a determination is made that no additional concrete testing of the first software using test cases is necessary.

When there are additional test cases and additional testing is desired, the method 300 may proceed to block 302 and the method 300 may repeat blocks 302, 304, 306, 308, 310, 312, and/or 314 until there are no additional test cases or some other criteria is met that indicates that no additional test cases are to be used to test the first software.

In block 316, the first software may be symbolically executed using one or more symbolic inputs based on the recorded execution paths. Symbolically executing the first software based on the recorded execution paths may include not solving a path condition formula for portions of one or more of the execution paths of the first software for which there is a recorded concrete execution. For example, as illustrated in FIG. 2, the first, the second, and the third execution paths 140, 142, 246 may be traversed during the concrete execution of the test cases test1, test2, and test3. During symbolic execution, the execution path for which path condition formulas may be solved may be the fourth execution path 248. By symbolically executing the execution paths and/or portions of execution paths not covered by the test cases, better testing coverage of the first software may be achieved. Furthermore, by not symbolically executing those execution paths and/or portions of execution paths that were concretely executed, a number of execution paths and/or portions of execution paths for which path condition formulas are generated and solved may be reduced. Thus, the method 300 may provide better testing coverage and/or reduced testing time and resource usage compared to developing new test cases for the first software or to using only test cases associated with the second software. Additionally, the method 300 may provide reduced testing time and resource usage compared to symbolically executing the first software.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, test cases may not be determined to be redundant in block 310 and the method 300 may proceed from block 308 to block 314. Alternately or additionally, block 312 may be removed from the method 300.

In some embodiments, the method 300 may include developing test cases based on the symbolic execution of the first software. When an execution path and/or a portion of an execution path of the first software is symbolically executed, concrete input values may be determined that may be used to develop a test case that may be used for future testing of the first software, for future versions of the first software, and/or for other software testing.

In some embodiments, for some and/or all of the test cases executed in block 306, the concrete execution paths traversed in the first software using the test cases may be compared with second concrete execution paths traversed in the second software using the test cases to determine which of the concrete execution paths are substantially similar to the second concrete execution paths of the second software. For example, a first execution path formed by concretely executed the first software using a first test case may be compared with a second execution path formed by concretely executing the second software associated with the first test case to determine if the first execution path is substantially similar to the second execution path of the second software.

The first execution path may be substantially similar to the second execution path of the second software when the first and second execution paths execute the same sequence of program statements, execute the same sequence of assembly or byte-code instructions, execute the same sequence of function calls, execute the same software branches that evaluate to the same values, and/or are otherwise substantially similar.

When the first execution path is substantially similar to the second execution path of the second software, the method 300 may further include verifying the correctness of the first software. To verify the correctness of the first software, a first output resulting from executing the first software using the first test case may be compared with a secondary output resulting from executing the secondary software using the first test case. In some embodiments, the second output may have been verified as indicating correct functionality of the second software. When the secondary output is substantially similar to the first output and the first and second execution paths are substantially similar, then the correctness of the first software with respect to the first test case may be verified.

As an example, the first execution path 140 traversed by the function example1 using the test case test1 from FIG. 1 is substantially similar to the first execution path 140 traversed by the function example 2 using the test case test1 from FIG. 2. The output of the function example1 using the test case test 1 and the output of the function example2 using the test case test1 are both 3. Thus, the correctness of the function example2 is verified with respect to the test case test1.

Figure 4:
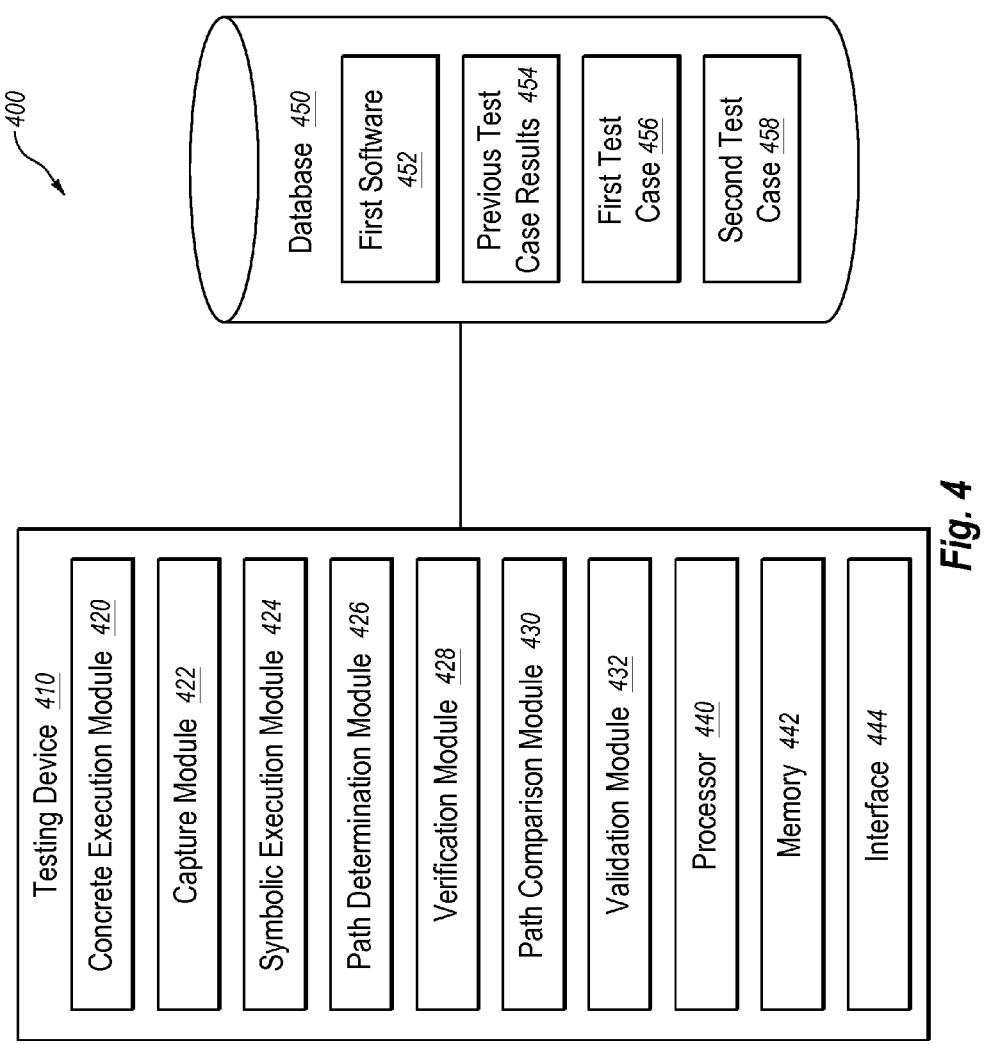
FIG. 4 is a block diagram of an example testing system of testing software.

FIG. 4 is a block diagram of an example testing system 400 of testing software, arranged in accordance with at least some embodiments described herein. The testing system 400 may include a testing device 410 that is communicatively coupled to a database 450. The testing device 410 may include, but is not limited to, a concrete execution module 420, a capture module 422, a symbolic execution module 424, a path determination module 426, a verification module 428, a path comparison module 430, a validation module 432, a processor 440, a memory 442, and an interface module 444. The testing device 410 may be configured so that each of the concrete execution module 420, the capture module 422, the symbolic execution module 424, the path determination module 426, the verification module 428, the path comparison module 430, the validation module 432, the processor 440, the memory 442, and the interface module 444 may communicate with each other and share information. The database 450 may include first software 452 to be tested by the testing device 410, previous test case results 454, a first test case 456, and a second test case 458.

The first software 452 to be tested using the testing system 400 may include one or more execution paths formed from one or more software statements. The number of execution paths of the first software 452 may vary based on the complexity, the number of input variables, and/or other aspects of the first software 452. The testing system 400 may also use various test cases to test the first software 452. For example, the testing system 400 may use the first test case 456 and/or the second test case 458 to test the first software 452. The first test case 456 and the second test case 458 may be constructed for and associated with second software that is distinct from the first software 452. Alternately or additionally, the first test case 456 may be constructed for and associated with the second software and the second test case 458 may be constructed for and associated with third software. In some embodiments, the second software and/or the third software may be related to the first software 452. For example, the second software and/or the third software may include an earlier version of the first software 452. The first software 452 may be written in any type of computer language, such as Java, C, C++, Pearl, Scheme, Python, among others. The first and second test cases 456, 458 may be written in the same computer language as the first software 452 or in a different computer language. In some embodiments, the first and second test cases 456, 458 may be written in the same or different computer languages.

The concrete execution module 420 may be configured to access the first software 452 and the first test case 456 from the database 450. The concrete testing module 420 may further be configured to concretely execute the first software 452 using the first test case 456 to traverse an execution path of the first software 452. In some embodiments, the concrete execution module 420 may be configured to access the second test case 458 from the database 450 and to concretely execute the first software 452 using the second test case 458.

The capture module 422 may be configured to capture concrete execution results produced when the concrete execution module 420 concretely executes the first and/or second test cases 456, 458. The concrete execution results may include an indication of an execution path and/or a portion of an execution path of the first software 452 that is traversed when a test case, such as the first and/or the second test case 456, 458 is executed.

In some embodiments, the execution path may be recorded using one or more data strings. The data strings may be stored in a data-structure, such as a trie, hash, binary tree data-structure, among other data-structures. In some embodiments, recording the execution path may result in forming a partial execution tree. An execution tree may be a data structure that includes information about execution paths of software that provide coverage of the software. A partial execution tree may include information about execution paths of software that provide partial coverage of the software.

The symbolic execution module 424 may be configured to symbolically execute the software 452 using one or more symbolic inputs based on the recorded execution path. Symbolically executing the software 452 based on the recorded execution path may include not generating and solving a path condition formula for portions of one or more of the execution paths of the software 452 for which there is a recorded execution path.

The path determination module 426 may be configured to determine when the execution path traversed by the first software 452 using the first test case 456 is substantially similar to a second execution path stored in the previous test case results 454. The second execution path may be an execution path traversed by the second software using the first test case 456. The path determination module 426 may compare the execution path and the second execution path and may determine that the execution path and the second execution path are substantially similar when the execution paths execute the same sequence of program statements, execute the same sequence of assembly or byte-code instructions, execute the same sequence of function calls, execute the same software branches that evaluate to the same values, and/or are otherwise substantially similar. The path determination module 426 may send the determination of the similarity of the execution path and the second execution path to the verification module 428. The path determination module 426 may also be configured to perform similar functions with respect to the second test case 458 and/or with respect to one or more other test cases (not shown).

The verification module 428 may be configured to receive the determination of the similarity of the execution path and the second execution path from the path determination module 426. When the execution path and the second execution path are substantially similar, the verification module 428 may be further configured to verify a correctness of the first software 452 by comparing a first output from executing the first software 452 using the first test case 456 with a second output from executing the second software using the first test case 456 as stored in the previous test case results 454. When the first output equals the second output and the second output is previously verified as correct, the first output is correct and the correctness of the first software 452 for the first test case 456 is verified. In some embodiments, the second output may be part of the first test case 456 and not stored in the previous test case results 454. In some embodiments, the verification module 428 may also be configured to perform similar functions with respect to the second test case 458 to verify the correctness of the first software 452 for the second test case 458.

The path comparison module 430 may be configured to compare the execution path traversed by the first software 452 when executing the first test case 456 with a second execution path traversed by the first software 452 when executing the second test case 458. The path comparison module 430 may compare the execution path and the second execution path to determine if the execution path and the second execution path are substantially similar. The execution path and the second execution path may be substantially similar when the execution path and the second execution path follow the same sequence of program statements, follow the same sequence of byte-code and/or assembly instructions, follow the same sequence of function calls, and/or follow the same branches that evaluate to the same values, among other criteria. When the path comparison module 430 determines that the execution path and the second execution path are substantially similar, the path comparison module 430 may mark the execution path or the second execution path as redundant.

The validation module 432 may be configured to validate the first and/or second test cases 456, 458. Validating the first and/or second test cases 456, 458 may include determining if the first software 452 may be executed using the first and/or second test cases 456, 458. In some embodiments, the validation module 432 may validate the first and/or second test cases 456, 458 before concretely executing the first software 452 using the first and/or second test cases 456, 458.

The processor 440 may be configured to execute computer instructions that cause the testing system 400 to perform the functions and operations described herein. The computer instructions may be loaded into the memory 442 for execution by the processor 440 and/or data generated, received, or operated on during performance of the functions and operations described herein may be at least temporarily stored in the memory 442.

The interface module 444 may be configured to receive data from and/or to send data to other systems, users, and/or other processes over any type of communications network. In some embodiments, the interface module 444 may be configured to receive and/or store in the memory 442, the first software 452, the previous test case results 454, the first test case 456, and/or the second test case 458.

Modifications, additions, or omissions may be made to the testing system 400 without departing from the scope of the present disclosure. For example, the testing system 400 may not include the database 450. In these and other embodiments, the first software 452, the previous test case results 454, the first test case 456, and/or the second test case 458 may be stored in the memory 442. As another example, the database 450 may include multiple test cases besides the first test case 456 and the second test case 458. In these and other embodiments, the testing device 410 may access and use the multiple test cases in a similar manner as described above. In some embodiments, the testing system 400 may be implemented using software of one type to test the first software 452 of the same or of a different type. For example, the testing system 400 may be implemented using C++ to test the first software 452 that may be either C++, C, or some other programming language.

Figure 5:
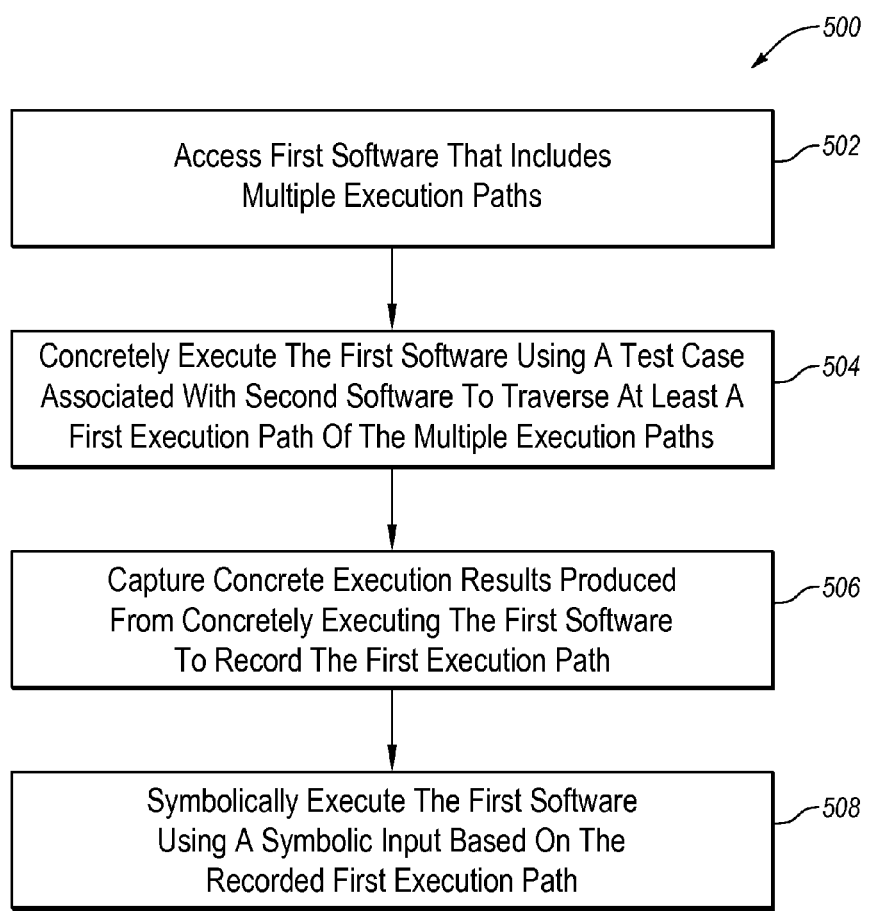
FIG. 5 is a flow chart of another example method of testing software.

FIG. 5 is a flow chart of an example method 500 of testing software, arranged in accordance with at least some embodiments described herein. The method 500 may be implemented, in some embodiments, by a testing system, such as the testing system 400 of FIG. 4. For instance, the processor 440 of the testing system 400 of FIG. 4 may be configured to execute computer instructions to perform operations for testing software as represented by one or more of blocks 502, 504, 506, and/or 508 of the method 500. Although illustrated as discrete blocks, various blocks may be divided into additional blocks, combined into fewer blocks, or eliminated, depending on the desired implementation.

The method 500 may begin at block 502, where first software that includes multiple execution paths may be accessed. Each of the multiple execution paths may include one or more branching points. The number of execution paths and branching points may vary based on a complexity, a number of input variables, and other aspects of the first software.

In block 504, the first software may be concretely executed using a test case associated with second software to traverse at least a first execution path of the multiple execution paths. In some embodiments, the second software may be related to the first software. In these and other embodiments, the second software may be a previous version of the first software. In some embodiments, the test case being associated with the second software may indicate that the test case is constructed for or valid for the second software.

In block 506, concrete execution results produced from concretely executing the first software may be captured to record the first execution path. In some embodiments, capturing the concrete execution results may include recording at least a portion of the first execution path to form a partial symbolic execution tree. In some embodiments, capturing the concrete execution results may include recording the software statements and/or code lines of the first software that are executed when traversing the first execution path. In some embodiments, capturing the concrete execution results may include recording other information about the first execution path.

In block 508, the first software may be symbolically executed using a symbolic input based on the recorded first execution path. In some embodiments, symbolically executing the first software may include generating and solving a path condition formula of a portion of one of the multiple execution paths when the portion of the one of the multiple execution paths is not included in the recorded first execution path.

The outlined steps and operations of FIG. 5 are only provided as examples, and some of the steps and operations may be optional, combined into fewer steps and operations, or expanded into additional steps and operations without detracting from the essence of the disclosed embodiments.

For example, the method 500 may further include determining when the first execution path is substantially similar to a second execution path. The second execution path may result from executing the second software using the test case.

In some embodiments, the first execution path may be substantially similar to the second execution path when the first and second execution paths: execute the same sequence of program statements, execute the same sequence of assembly or byte-code instructions, execute the same sequence of function calls, or execute the same software branches that evaluate to the same values, among other criteria.

In some embodiments, when the first execution path is substantially similar to the second execution path, the method 500 may further include verifying a correctness of the first software by comparing a first output from executing the first software using the first test case with a second output from executing the second software using the first test case.

In some embodiments, the method 500 may further include validating the test case before concretely executing the first software using the test case.

In some embodiments, the method 500 may further include concretely executing the first software using a second test case associated with the second software to traverse a second execution path of the multiple execution paths. The second execution path may be compared to the first execution path and when the second execution path is substantially similar to the first execution path, the second test case may be labeled as redundant.

In some embodiments, the method 500 may be implemented using software of one type to test the software of the same or of a different type. For example, the method 500 may be implemented using C++ to test the software that may be either C++, C, or some other programming language.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transistory and/or tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of testing software, the method comprising:
accessing first software comprising a plurality of execution paths;
concretely executing the first software using a test case associated with second software to traverse at least a first execution path of the plurality of execution paths;
capturing concrete execution results produced from concretely executing the first software using the test case to record the first execution path, the concrete execution results produced without solving a path condition formula for the first software; and
after capturing the concrete execution results produced using the test case, symbolically executing the first software using a symbolic input such that the concrete execution and the symbolic execution are performed sequentially and not in parallel, the symbolic execution of the first software including generating and solving the path condition formula of a portion of one of the plurality of execution paths when the portion of the one of the plurality of execution paths is not included in the recorded first execution path.

2. The method of claim 1, wherein the second software is a previous version of the first software.

3. The method of claim 1, further comprising determining when the first execution path is substantially similar to a second execution path, the second execution path resulting from executing the second software using the test case.

4. The method of claim 3, wherein the first execution path is substantially similar to the second execution path when the first and second execution paths: execute the same sequence of program statements, execute the same sequence of assembly or byte-code instructions, execute the same sequence of function calls, or execute the same software branches that evaluate to the same values.

5. The method of claim 3, further comprising, when the first execution path is substantially similar to the second execution path, verifying a correctness of the first software by comparing a first output from executing the first software using the test case with a second output from executing the second software using the test case.

6. The method of claim 1, further comprising validating the test case before concretely executing the first software using the test case.

7. The method of claim 1, further comprising
concretely executing the first software using a second test case associated with the second software to traverse a second execution path of the plurality of execution paths;
comparing the second execution path with the first execution path; and
when the second execution path is substantially similar to the first execution path, labeling the second test case as redundant.

8. The method of claim 1, wherein a first portion of the first software associated with the test case is a logically different version of a second portion of the second software associated with the test case.

9. A non-transitory computer-readable storage medium with an executable program stored thereon, wherein the program instructs a processor to perform operations comprising:
accessing first software comprising a plurality of execution paths;
concretely executing the first software using a test case associated with second software to traverse at least a first execution path of the plurality of execution paths;

capturing concrete execution results produced from concretely executing the first software using the test case to record the first execution path, the concrete execution results produced without solving a path condition formula for the first software; and after capturing the concrete execution results produced using the test case, symbolically executing the first software using a symbolic input such that the concrete execution and the symbolic execution are performed sequentially and not in parallel, the symbolic execution of the first software including generating and solving the path condition formula of a portion of one of the plurality of execution paths when the portion of the one of the plurality of execution paths is not included in the recorded first execution path.

10. The non-transitory computer-readable storage medium of claim 9, wherein the second software is a previous version of the first software.

11. The non-transitory computer-readable storage medium of claim 9, wherein the operations further comprise determining when the first execution path is substantially similar to a second execution path, the second execution path resulting from executing the second software using the test case.

12. The non-transitory computer-readable storage medium of claim 11, wherein the first execution path is substantially similar to the second execution path when the first and second execution paths: execute the same sequence of program statements, execute the same sequence of assembly or byte-code instructions, execute the same sequence of function calls, or execute the same software branches that evaluate to the same values.

13. The non-transitory computer-readable storage medium of claim 11, wherein the operations further comprise verifying a correctness of the first software when the first execution path is substantially similar to the second execution path by comparing a first output from executing the first software using the test case with a second output from executing the second software using the test case.

14. The non-transitory computer-readable storage medium of claim 9, wherein the operations further comprise validating the test case before concretely executing the first software using the test case.

15. The non-transitory computer-readable storage medium of claim 9, wherein the operations further comprise:
    comparing the first execution path with a second execution path of the plurality of execution paths traversed by the first software based on a second test case associated with the second software; and
    labeling the second test case as redundant when the first and second execution paths are substantially similar.

16. The non-transitory computer-readable storage medium of claim 9, wherein a first portion of the first software associated with the test case is a logically different version of a second portion of the second software associated with the test case.

17. A processor configured to execute computer instructions to cause a system to perform operations for testing software, the operations comprising:
    accessing first software comprising a first plurality of execution paths;
    concretely executing the first software using a test case associated with second software to traverse a first execution path of the plurality of execution paths;
    capturing concrete execution results produced from executing the first software using the test case to record the first execution path, the concrete execution results produced without solving a path condition formula for the first software; and
    after capturing the concrete execution results produced using the test case, symbolically executing the first software using a symbolic input such that the concrete execution and the symbolic execution are performed sequentially and not in parallel, the symbolic execution of the first software including generating and solving the path condition formula of a portion of one of the plurality of execution paths when the portion of the one of the plurality of execution paths is not included in the recorded first execution path.

18. The processor of claim 17, wherein the second software is a previous version of the first software, wherein a first portion of the first software associated with the test case is a logically different version of a second portion of the second software associated with the test case.

19. The processor of claim 17, wherein the operations further comprise validating the test case before concretely executing the first software using the test case.

20. The processor of claim 17, wherein the operations further comprise determining when the first execution path is substantially similar to a second execution path, the second execution path resulting from executing the second software using the test case.

21. The processor of claim 20, wherein the operations further comprise, when the first execution path is substantially similar to the second execution path, verifying a correctness of the first software by comparing a first output from executing the first software using the test case with a second output from executing the second software using the test case.

22. The processor of claim 17, wherein the operations further comprise:
    concretely executing the first software using a second test case associated with the second software to traverse a second execution path of the plurality of execution paths;
    comparing the second execution path with the first execution path; and
    when the second execution path is substantially similar to the first execution path, labeling the second test case as redundant.

* * * * *